United States Patent
Kamio

(10) Patent No.: US 11,084,493 B2
(45) Date of Patent: Aug. 10, 2021

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/807,568

(22) Filed: Mar. 3, 2020

(65) Prior Publication Data

US 2020/0198639 A1   Jun. 25, 2020

Related U.S. Application Data

(63) Continuation of application No. PCT/JP2018/033229, filed on Sep. 7, 2018.

(30) Foreign Application Priority Data

Sep. 11, 2017   (JP) .............................. JP2017-174030

(51) Int. Cl.
  *B60W 30/19*   (2012.01)
  *B60W 10/06*   (2006.01)
  *B60W 10/11*   (2012.01)

(52) U.S. Cl.
  CPC ............ *B60W 30/19* (2013.01); *B60W 10/06* (2013.01); *B60W 10/11* (2013.01);
  (Continued)

(58) Field of Classification Search
  CPC ...... B60W 30/19; B60W 10/06; B60W 10/11; B60W 2510/0652; B60W 2510/0657;
  (Continued)

(56) References Cited

U.S. PATENT DOCUMENTS

| 2003/0222617 A1 | 12/2003 | Nakai et al. |
| 2006/0033464 A1 | 2/2006 | Nakai et al. |

(Continued)

FOREIGN PATENT DOCUMENTS

| JP | 10-210788 | 8/1998 |
| JP | 2004-129400 | 4/2004 |

(Continued)

OTHER PUBLICATIONS

U.S. Appl. No. 16/801,598, inventor: Yamada, entitled "Shift Range Control Device", filed Feb. 26, 2020, (37 pages).

(Continued)

*Primary Examiner* — Justin Holmes
(74) *Attorney, Agent, or Firm* — Nixon & Vanderhye P.C.

(57) ABSTRACT

A shift range control device switches a shift range by controlling the drive of a motor. An angle calculation unit calculates a motor angle based on a motor rotation angle signal acquired from a motor rotation angle sensor detecting a rotational position of the motor. An acceleration calculation unit calculates a motor acceleration based on the motor angle. A moving average calculation unit calculates an acceleration moving average value as a moving average of at least one of a predetermined electrical angle cycle and a predetermined mechanical angle cycle of the motor acceleration. A drive control unit adopts the acceleration moving average value to control the drive of the motor such that the motor angle becomes a target motor angle value corresponding to a target shift range.

4 Claims, 5 Drawing Sheets

(52) U.S. Cl.
CPC ............ *B60W 2510/0652* (2013.01); *B60W 2510/0657* (2013.01); *B60W 2510/0685* (2013.01); *B60W 2710/10* (2013.01)

(58) Field of Classification Search
CPC ....... B60W 2510/0685; B60W 2710/10; F16H 61/28; F16H 2061/283; H02P 29/00
See application file for complete search history.

(56) References Cited

U.S. PATENT DOCUMENTS

| | | |
|---|---|---|
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0056450 A1* | 3/2011 | Notani ................ F02N 11/0855 123/179.4 |
| 2011/0068730 A1 | 3/2011 | Nakai et al. |
| 2011/0127104 A1* | 6/2011 | Shibahata ............. B62D 5/001 180/446 |
| 2013/0144478 A1 | 6/2013 | Suzuki et al. |
| 2016/0214614 A1* | 7/2016 | Shirasaki ................ F16H 61/04 |

FOREIGN PATENT DOCUMENTS

| | | |
|---|---|---|
| WO | 2019/049809 | 3/2019 |
| WO | 2019/049995 | 3/2019 |

OTHER PUBLICATIONS

U.S. Appl. No. 16/811,170, inventor: Kamio, entitled "Shift Range Control Device", filed Mar. 6, 2020, (29 pages).

* cited by examiner

SHIFT RANGE CONTROL DEVICE

CROSS REFERENCE TO RELATED APPLICATIONS

The present application is a continuation application of International Patent Application No. PCT/JP2018/033229 filed on Sep. 7, 2018, which designated the U.S. and claims the benefit of priority from Japanese Patent Application No. 2017-174030 filed on Sep. 11, 2017. The entire disclosures of all of the above applications are incorporated herein by reference.

TECHNICAL FIELD

The present disclosure relates to a shift range control device.

BACKGROUND

A shift range switching device may switch a shift range by controlling a motor in response to a shift range switching request from a driver. For example, the detected value of an output shaft sensor is adopted.

SUMMARY

The present disclosure describes a shift range control device for switching a shift range.

BRIEF DESCRIPTION OF DRAWINGS

The above object and other objects, features, and advantages of the present disclosure will become more apparent from the following detailed description with reference to the accompanying drawings. In the drawing.

DETAILED DESCRIPTION

For example, when the detected value of the output shaft sensor cannot be used, it may be difficult to execute highly accurate positioning control on the motor. It is an object of the present disclosure to provide a shift range control device for highly accurate positioning control.

A shift range control device of the present disclosure switches a shift range by controlling the drive of a motor and includes an angle calculation unit, an acceleration calculation unit, a moving average calculation unit, and a drive control unit. The angle calculation unit calculates a motor angle based on a motor rotation angle signal acquired from a motor rotation angle sensor detecting a rotational position of the motor. The acceleration calculation unit calculates a motor acceleration based on the motor angle. The moving average calculation unit calculates an acceleration moving average value that is a moving average of at least one of a predetermined electrical angle cycle and a predetermined mechanical angle cycle of the motor acceleration. The drive control unit uses the acceleration moving average value to control the drive of the motor such that the motor angle becomes a target motor angle value corresponding to a target shift range. By calculating the acceleration moving average value, a vibration component of the motor acceleration may be reduced, and therefore, highly accurate positioning control may be executed by adopting the acceleration moving average value.

First Embodiment

Figure 1:
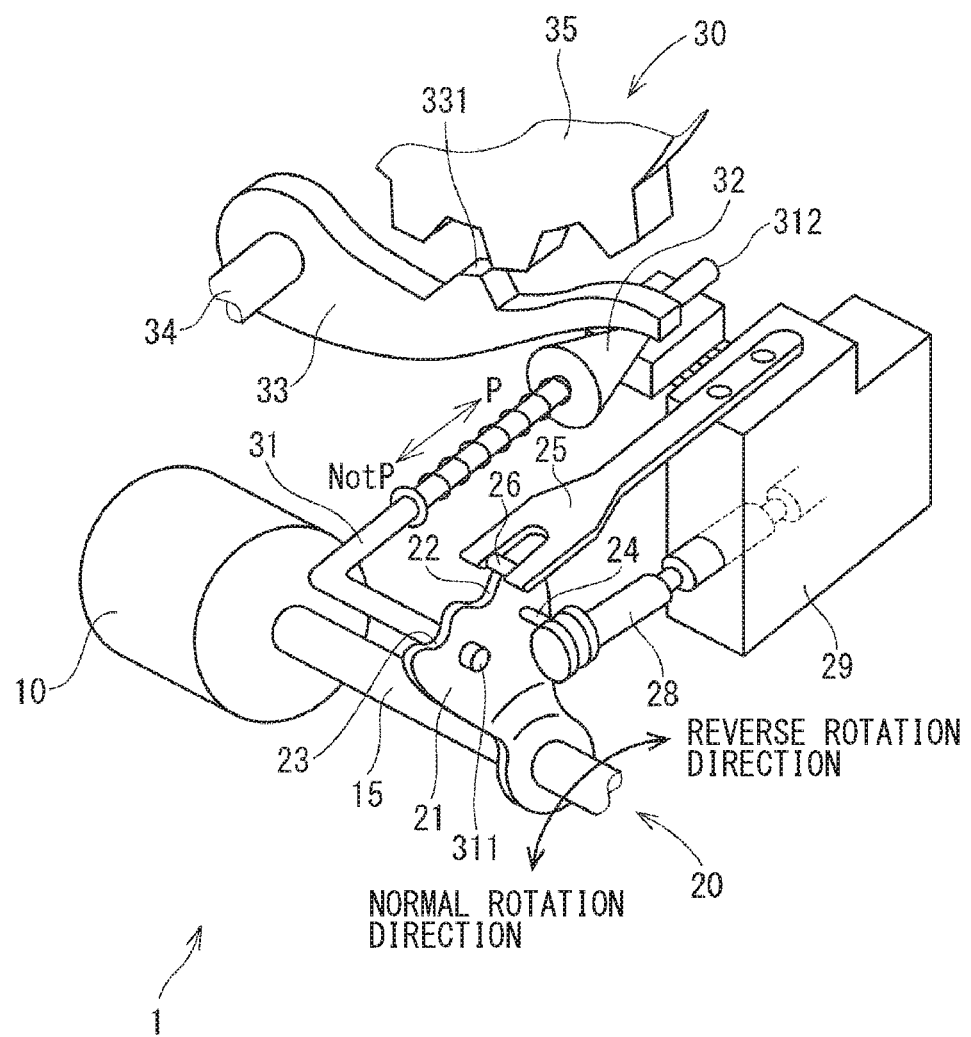
FIG. 1 is a perspective view showing a shift-by-wire system according to a first embodiment.
Figure 2:
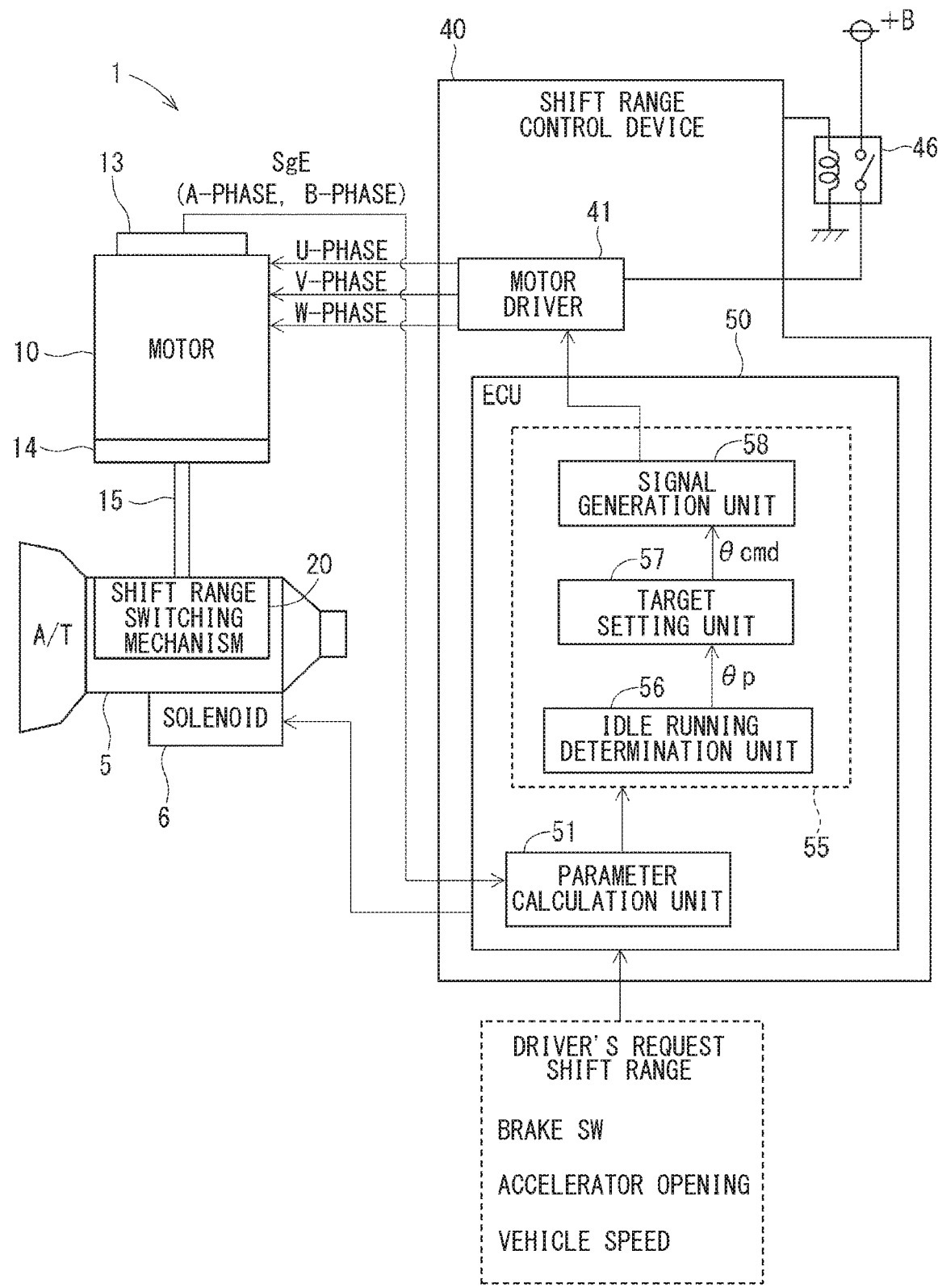
FIG. 2 is a schematic configuration diagram showing the shift-by-wire system according to the first embodiment.

The following describes a shift range control device with reference to the drawings. A shift range control device according to a first embodiment is shown in FIGS. 1 to 6. As shown in FIGS. 1 and 2, a shift-by-wire system 1 being a shift range switching system includes a motor 10, a shift range switching mechanism 20, a parking lock mechanism 30, a shift range control device 40, and the like. The motor 10 rotates by being supplied with electric power from a battery mounted in a vehicle (not shown), and functions as a drive source for the shift range switching mechanism 20. The motor 10 of the present embodiment is a permanent magnet-type direct-current (DC) brushless motor.

As shown in FIG. 2, an encoder 13 as a motor rotation angle sensor detects a rotational position of a rotor (not shown) of the motor 10. The encoder 13 is, for example, a magnetic rotary encoder and includes a magnet that rotates integrally with the rotor, a magnetic detection hall integrated circuit (IC), and the like. The encoder 13 outputs pulse signals of an A-phase and a B-phase at predetermined angles in synchronization with the rotation of the rotor. The signal from the encoder 13 may be referred to as a motor rotation angle signal SgE.

A speed reducer 14 is provided between a motor shaft 105 (see FIG. 4) of the motor 10 and an output shaft 15, decelerates the rotation of the motor 10, and outputs the rotation to the output shaft 15. The rotation of the motor 10 is transmitted to the shift range switching mechanism 20. In the present embodiment, an output shaft sensor that detects the rotational position of the output shaft 15 may be omitted.

As shown in FIG. 1, the shift range switching mechanism 20 includes the detent plate 21, a detent spring 25, and the like and transmits a rotational driving force, output from the speed reducer 14, to a manual valve 28 and the parking lock mechanism 30. The detent plate 21 is fixed to the output shaft 15 and driven by the motor 10. In the present embodiment, a direction in which the detent plate 21 is separated from the base of the detent spring 25 is defined as a normal rotation direction, and a direction in which the detent plate 21 approaches the base is defined as a reverse rotation direction.

The detent plate 21 is provided with a pin 24 that protrudes in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into linear motion and transmits the linear motion to the manual valve 28. The manual valve 28 is provided on a valve body 29. A hydraulic pressure supply path to a hydraulic clutch (not shown) is switched by the reciprocation of the manual valve 28 in the axial direction, and the shift range is changed by the switching of the engagement state of the hydraulic clutch. Two recesses 22, 23 are provided in the detent plate 21 on the detent spring 25. In the present embodiment, the side closer to the base of the detent spring 25 is the recess 22 and the side farther therefrom is the recess 23. In the present embodiment, the recess 22 corresponds to a not-P range except for a P range, and the recess 23 corresponds to the P range.

The detent spring 25 is an elastically deformable plate-like member, and a detent roller 26 is provided at the tip of the detent spring 25. The detent spring 25 biases the detent roller 26 toward the revolving center of the detent plate 21. When a rotational force equal to or greater than a predetermined force is applied to the detent plate 21, the detent spring 25 is elastically deformed, and the detent roller 26 moves between the recesses 22, 23. By the detent roller 26 being fitted into either the recess 22 or the recess 23, a swing of the detent plate 21 is restricted, an axial position of the manual valve 28 and the state of the parking lock mechanism 30 are determined, and the shift range of an automatic transmission 5 is fixed. The detent roller 26 fits into the recess 22 when the shift range is the not-P range, and fits into the recess 23 when the shift range is the P range.

The parking lock mechanism 30 includes a parking rod 31, a cone 32, a parking lock pole 33, a shaft portion 34, and a parking gear 35. The parking rod 31 is formed in a substantially L shape, and one end 311 is fixed to the detent plate 21. The cone 32 is provided on the other end 312 of the parking rod 31. The cone 32 is formed so as to decrease in diameter toward the other end 312. When the detent plate 21 swings in the reverse rotation direction, the cone 32 moves in a P direction.

The parking lock pole 33 is in contact with the conical surface of the cone 32. A protrusion 331, which meshes with the parking gear 35, is provided at a side of the parking lock pole 33 near the parking gear 35 so as to be able to swing around the shaft portion 34. When the detent plate 21 rotates in the reverse rotation direction and the cone 32 moves in the direction of arrow P, the parking lock pole 33 is pushed up, and the protrusion 331 and the parking gear 35 mesh with each other. When the detent plate 21 rotates in the normal rotation direction and the cone 32 moves in a direction of arrow NotP, the engagement between the protrusion 331 and the parking gear 35 is released.

The parking gear 35 is provided on an axle (not shown) and is provided so as to be able to mesh with the protrusion 331 of the parking lock pole 33. When the parking gear 35 and the protrusion 331 mesh with each other, the rotation of the axle is restricted. When the shift range is a not-P range, the parking gear 35 is not locked by the parking lock pole 33, and the rotation of the axle is not hindered by the parking lock mechanism 30. When the shift range is the P range, the parking gear 35 is locked by the parking lock pole 33, and the rotation of the axle is restricted.

As shown in FIG. 2, the shift range control device 40 includes a motor driver 41, the ECU 50, and the like. The motor driver 41 has a switching element (not shown), and switches energization to each phase (U-phase, V-phase, W-phase) of the motor 10 by turning on and off the switching element based on a command from the ECU 50. The motor 10 is driven. A motor relay 46 is provided between the motor driver 41 and the battery. The motor relay 46 is turned on when the vehicle start switch such as an ignition switch is on, and electric power is supplied to the motor 10. The motor relay 46 is turned off when the start switch is off, and the supply of the electric power to the motor 10 is cut off.

The ECU 50 includes a microcomputer or the like. The ECU 50 includes a central processing unit (CPU), a read-only memory (ROM), an input/output (I/O) (not shown), a bus line connecting these devices, and the like. Each processing in the ECU 50 may be software processing executed by the CPU executing a program stored in advance in a tangible memory device (i.e., a readable non-transitory tangible recording medium) such as a ROM, or may be hardware processing executed by a dedicated electronic circuit.

The ECU 50 controls the switching of the shift range by controlling the drive of the motor 10 based on the driver's request shift range, a signal from a brake switch, a vehicle speed, and the like. The ECU 50 further controls the drive of a transmission hydraulic control solenoid 6 based on the vehicle speed, an accelerator opening, the driver's request shift range, and the like. A gear stage is controlled by controlling the transmission hydraulic control solenoid 6. The number of transmission hydraulic control solenoids 6 is provided in accordance with the number of gear stages. In the present embodiment, one ECU 50 controls the drive of the motor 10 and the drive of the solenoid 6, but a motor ECU for controlling the motor 10 and an automatic transmission (AT)-ECU for controlling the solenoid may be separated. The following mainly describes the drive control for the motor 10.

As shown in FIG. 2, the ECU 50 includes a parameter calculation unit 51, a drive control unit 55, and the like. The parameter calculation unit 51 calculates an encoder count value θen as a count value of the encoder 13 based on the motor rotation angle signal SgE output from the encoder 13. The encoder count value θen is a value corresponding to an actual mechanical angle and electrical angle of the motor 10. In the present embodiment, the encoder count value θen corresponds to the "motor angle." The encoder count value θen is calculated for each edge-triggered interrupt of the motor rotation angle signal SgE.

The parameter calculation unit 51 calculates a motor speed SPm [deg/s] for each edge-triggered interrupt of the motor rotation angle signal SgE (see Expression (1)). A constant ke in the expression is a motor rotation angle corresponding to one count of the encoder count value θen, $t_{(n)}$ is the current interrupt time, and $t_{(n-1)}$ is the previous interrupt time. The motor speed SPm may also be regarded as an amount of change in motor angle per unit time.

$$SPm = ke/(t_{(n)} - t_{(n-1)}) \tag{1}$$

The parameter calculation unit 51 calculates a motor acceleration "a" [deg/s$^2$] for each edge-triggered interrupt of the motor rotation angle signal SgE (see Expression (2)). In the expression, $SPm_{(n)}$ is the motor speed in the current calculation, and $SPm_{(n-1)}$ is the motor speed in the previous calculation. Note that the motor speed SPm and the motor acceleration "a" may be calculated in any manner, such as differentiation of the motor angle. Further, a calculation cycle and the like may be set as appropriate.

$$a = (SPm_{(n)} - SPm_{(n-1)})/(t_{(n)} - t_{(n-1)}) \tag{2}$$

The parameter calculation unit 51 calculates acceleration moving average values A, AA that are moving average values of the motor acceleration "a" for each edge-triggered interrupt of the motor rotation angle signal SgE. The acceleration moving average value A is a moving average value for one electrical angle cycle (=360°). The acceleration moving average value A is calculated in Expression (3). The motor acceleration in the current calculation is $a_{(i)}$. The motor acceleration in calculation j times before is $a_{(i-j)}$. The number of encoder interrupts per electrical angle cycle is g.

$$A = \{a_{(i-g+1)} + a_{(i-g+2)} + \ldots + a_{(i-1)} + a_{(i)}\}/g \tag{3}$$

The acceleration moving average value AA is a moving average value for one mechanical angle cycle (=360°). The acceleration moving average value AA for one mechanical angle cycle is expressed by Expression (4). The acceleration moving average value A for one electrical angle cycle in the current calculation is $A_{(i)}$. The acceleration moving average value A in the calculation j times before is $A_{(i-j)}$. The number of encoder interrupts per mechanical angle cycle is h. g and h in the expressions are values determined in accordance with a resolution of the encoder 13 and the number of pole pairs, for example, g=12 and h=96.

$$AA = \{A_{(i-h+1)} + A_{(i-h+2)} + \ldots + A_{(i-1)} + A_{(i)}\}/h \quad (4)$$

The parameter calculation unit 51 calculates an estimated load torque TL [Nm].

The estimated load torque TL is calculated in Expression (5).

$$TL = TM_{(SPm)} - ki \times AA \quad (5)$$

Figure 3:
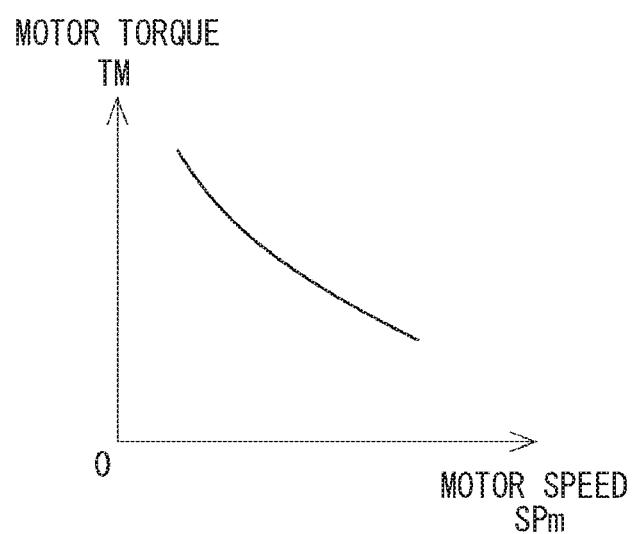
FIG. 3 is an explanatory diagram for explaining a map to be used for calculation of a motor torque according to the first embodiment.

$TM_{(SPm)}$ in the expression means that the motor torque TM is a function based on the motor speed SPm. In the present embodiment, the motor torque TM is calculated using the map shown in FIG. 3. As shown in FIG. 3, the motor torque TM increases as the motor speed SPm decreases. A constant ki in the expression is a value corresponding to inertia. A filtered value of the calculated estimated load torque TL is used for an idle running determination. Hereinafter, the estimated load torque TL is a value after filtering. The value calculated by the parameter calculation unit 51 is used for various control calculations.

The drive control unit 55 includes an idle running determination unit 56, a target setting unit 57, and a signal generation unit 58. The idle running determination unit 56 determines whether or not the state is an idle running state in which the motor 10 is rotating in a range of play between the motor shaft 105 and the output shaft 15. In particular, the idle running determination unit 56 detects timing at which the idle running state ends by using the idle running determination. In the present embodiment, the idle running determination is executed based on the estimated load torque TL calculated using the acceleration moving average value AA.

The target setting unit 57 sets a target shift range on the basis of the driver's request shift range based on a shift switch and the like, a vehicle speed, a signal from a brake switch, and the like. Further, the target setting unit 57 sets a target count value θcmd as a target motor angle value corresponding to the target shift range and the like. The target count value θcmd is corrected with an angle correction value θp corresponding to the encoder count value θen at the end of the idle running.

The signal generation unit 58 generates a control signal related to the drive control for the motor 10 by feedback control or the like so that the motor 10 stops at a rotational position where the encoder count value θen becomes the target count value θcmd. The generated control signal is output to the motor driver 41.

Figure 4:
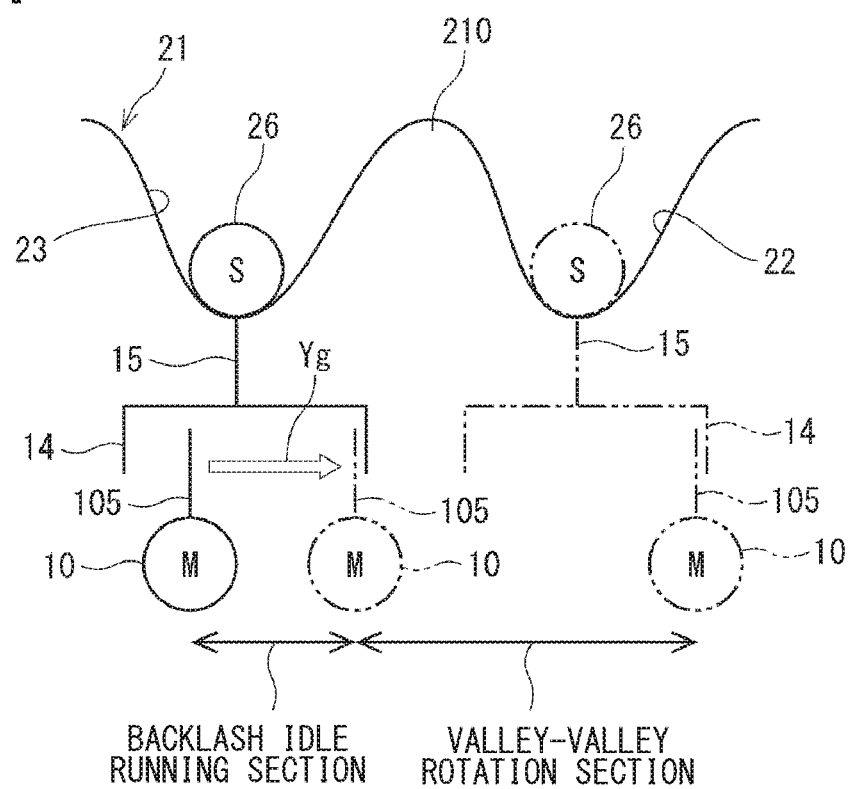
FIG. 4 is a schematic diagram for explaining play between a motor and an output shaft according to the first embodiment.
Figure 5:
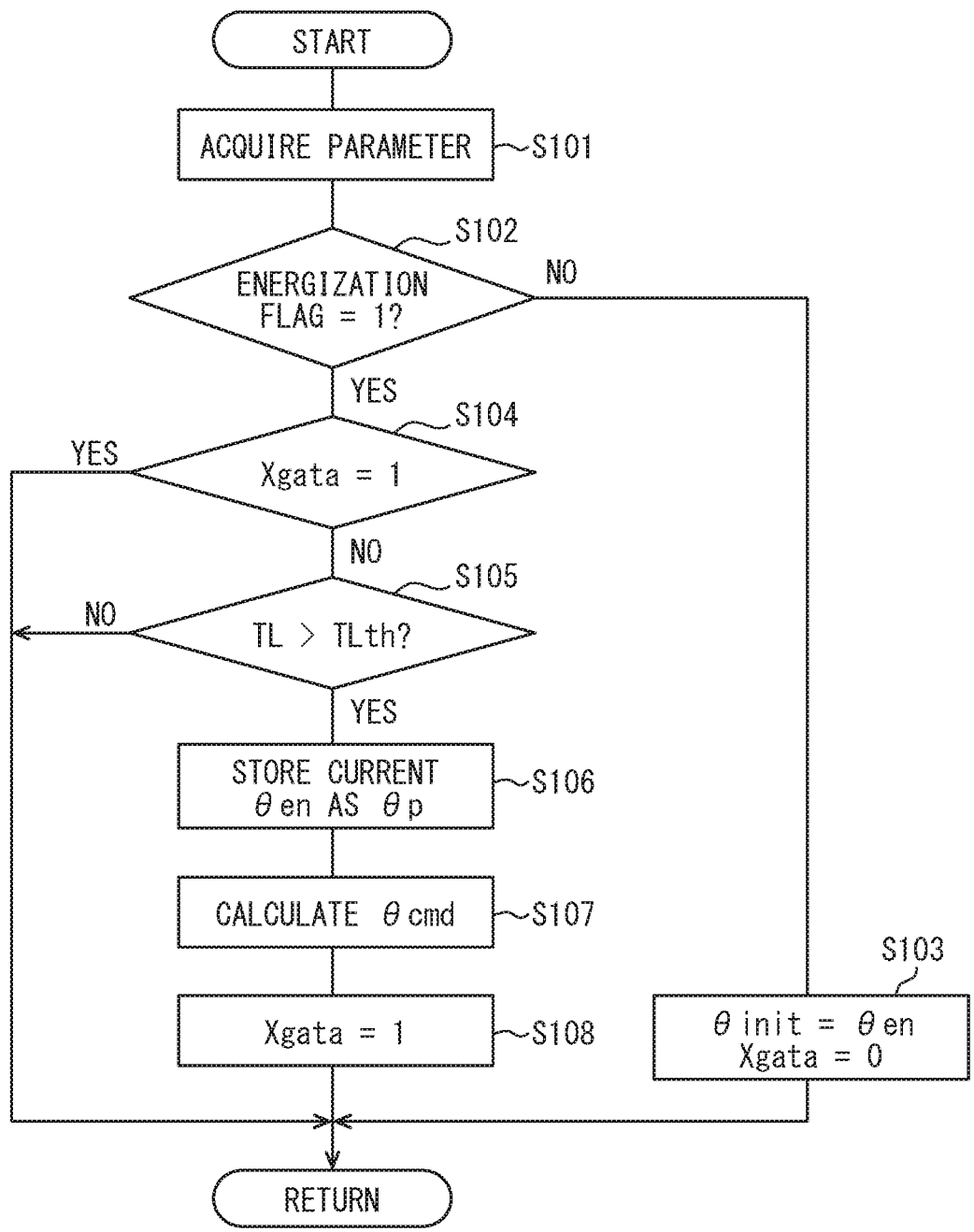
FIG. 5 is a flowchart for explaining target setting processing according to the first embodiment.

FIG. 4 shows the relationship among the motor shaft 105 that is a rotating shaft of the motor 10, the output shaft 15, and the detent plate 21. FIG. 4 schematically shows a state in which the motor 10 rotates from a state indicated by solid line to a state indicated by two-dot chain line, whereby the detent roller 26 gets over the peak 210 between the recesses 22, 23 of the detent plate 21 and fits into the recesses 22, 23 in accordance with the driver's request shift range. The following describes an example of switching from the P range to the not-P range. The description is made assuming that the rotation direction of each of the motor 10 and the output shaft 15 is a right-left direction in the drawing of FIG. 4. FIG. 4 is a schematic diagram conceptually showing "play," assuming that the output shaft 15 and the speed reducer 14 are integrated, and the motor shaft 105 can move within the range of play of the speed reducer 14. However, it may be configured such that the motor shaft 105 and the speed reducer 14 are integrated, and "play" exists between the speed reducer 14 and the output shaft 15.

As shown in FIG. 4, the speed reducer 14 is provided between the motor shaft 105 and the output shaft 15, and there is "play" including gear backlash between the motor shaft 105 and the output shaft 15. In the present embodiment, the motor 10 is a DC brushless motor, and when energization of the motor 10 is stopped, due to an influence of a cogging torque or the like, the motor shaft 105 may rotate within the range of play, and the motor shaft 105 and the speed reducer 14 may be separated from each other.

As indicated by arrow Yg, when the motor 10 rotates in a state where the motor shaft 105 and the speed reducer 14 are separated in the rotation direction, until the motor shaft 105 and the speed reducer 14 come into contact with each other, the motor 10 is in an idle running state, and the rotation of the motor 10 is not transmitted to the output shaft 15. A state in which the rotation of the motor 10 is not transmitted to the output shaft 15 within the range of play is referred to as a "backlash idle running state" or an "idle running state," and a section in which the state is the backlash idle running state is an "idle running section." The situation in which the backlash idle running state ends is referred to as "backlash ending."

When the backlash idle running ends, the motor 10, the output shaft 15, and the detent plate 21 rotate integrally. As a result, the detent roller 26 gets over the peak 210 between the recesses 22, 23 and moves to the recess 22. A section in which the detent roller 26 moves between the recesses 22, 23 after the end of the backlash idle running state may be referred to as a "valley-valley rotation section." Further, a section from the end of the backlash idle running state to a point before the detent roller 26 gets over the top of the peak 210 is referred to as an "integral rotation section."

When the energization is started to switch the shift range from a state where the energization of the motor 10 is off, it may be difficult to specify the position of the motor shaft 105 within the "play" range. In addition, when the motor shaft 105 and the speed reducer 14 are separated from each other in the rotational direction, as compared to the case of rotating the motor 10 from a state where the motor shaft 105 and the speed reducer 14 are in contact, extra rotation of the motor 10 is necessary for the backlash idle running.

For example, play amount may be learned by executing the abutting control. In the abutting control, the motor 10 is rotated to a limit position of a movable range with a relatively large torque, so that a detent mechanism of the shift range switching mechanism 20 is applied with stress. Hence, the shift range switching mechanism 20 needs to be designed so as to prevent damage from occurring even when stress is applied in the abutting control.

In the present embodiment, the drive of the motor 10 is controlled without using information related to the rotational position of the output shaft 15 based on the output shaft sensor and without executing the abutting control. Specifically, the end of backlash idle running is detected based on the estimated load torque TL, and the target count value θcmd is corrected, to ensure accuracy in position control.

The following describes the target setting processing of the present embodiment based on a flowchart shown in FIG.

5. Hereinafter, "step" in step S101 is omitted and simply referred to as "S." This also applies to the other steps. In the figure, a state where a flag has been set is "1," and a state where the flag has not been set is "0." In S101, the idle running determination unit 56 acquires a parameter calculated by the parameter calculation unit 51. In the present embodiment, the estimated load torque TL is acquired.

In S102, the idle running determination unit 56 determines whether or not an energization flag has been set. The energization flag is set when the target shift range is changed, and the energization flag is reset after it is determined that the motor 10 has been stopped. When the energization flag is set, the target count value θcmd is set to a temporary value θt, and the drive of the motor 10 is started. When it is determined that the energization flag has not been set (S102: NO), the processing proceeds to S103. When it is determined that the energization flag has been set (S102: YES), the processing proceeds to S104.

In S103, the idle running determination unit 56 stores the current encoder count value θen as a drive initial value θinit into the RAM (not shown) or the like. Further, the idle running determination unit 56 resets the learning flag Xgata. When the learning flag Xgata is reset, the reset state is held.

In S104, the idle running determination unit 56 determines whether or not the learning flag Xgata has been set. When it is determined that the learning flag Xgata has been set (S104: YES), this routine is terminated. When it is determined that the learning flag Xgata has not been set (S104: NO), the processing proceeds to S105.

In S105, the idle running determination unit 56 determines whether or not the estimated load torque TL is greater than a load determination threshold TLth. When it is determined that the estimated load torque TL is equal to or less than the load determination threshold TLth (S105: NO), it is determined that the backlash idle running is taking place, and this routine is terminated. When it is determined that the estimated load torque TL is greater than the load determination threshold TLth (S105: YES), it is determined that the idle running state has ended, and the processing proceeds to S106.

In S106, the idle running determination unit 56 stores the current encoder count value θen as the angle correction value θp into a storage unit such as the RAM (not shown). In S107, the target setting unit 57 calculates the target count value θcmd based on the angle correction value θp and a valley-valley angle design value θdet (see Expression (6)). In S108, the idle running determination unit 56 sets the learning flag Xgata.

$$\theta cmd=\theta init+\theta p+\theta det \quad (6)$$

Figure 6:
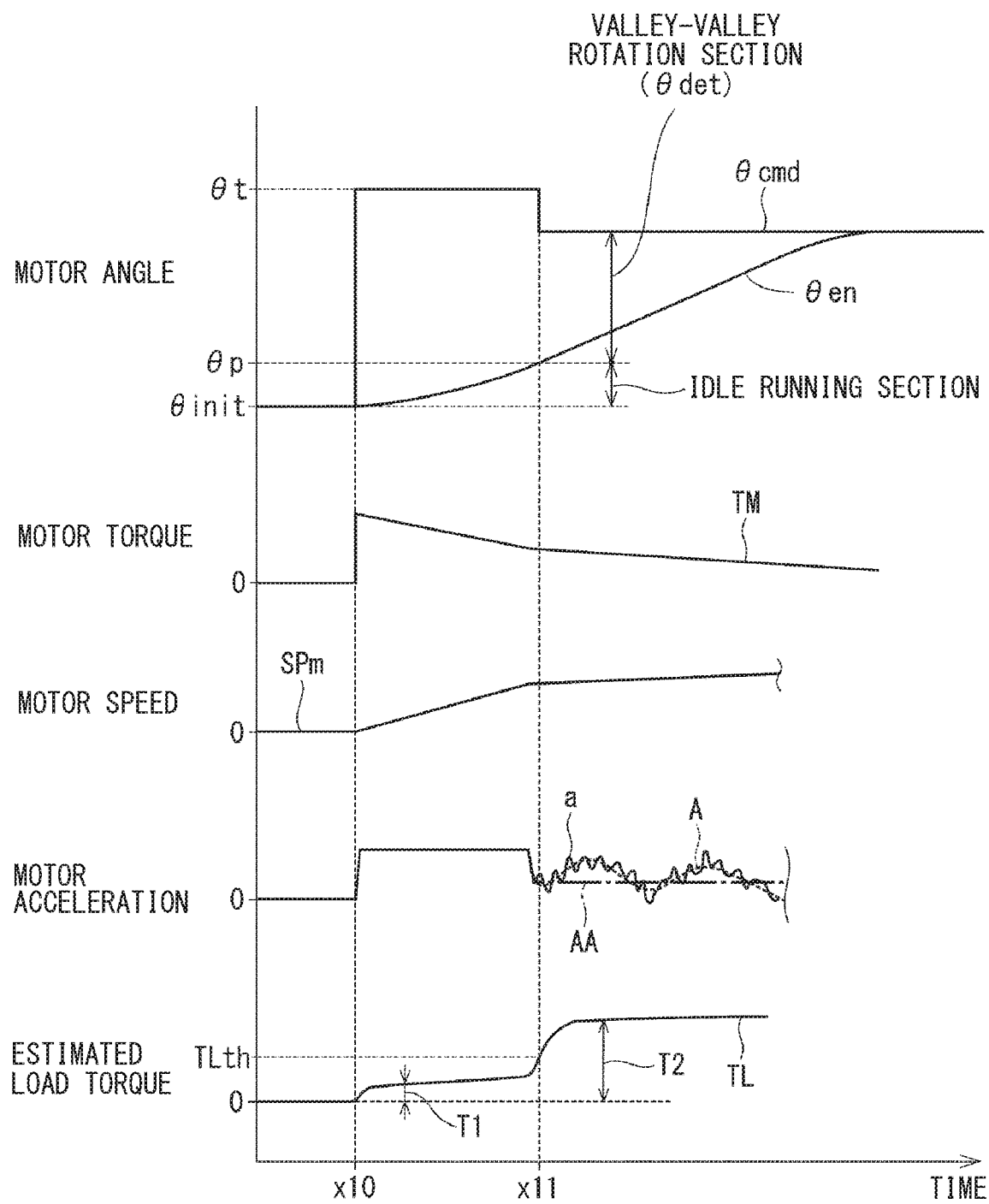
FIG. 6 is a time chart for explaining motor drive control processing according to the first embodiment.

Motor drive control processing of the present embodiment is described based on a time chart of FIG. 6. FIG. 6, from the top, shows a motor angle, the motor torque TM, the motor speed SPm, a motor acceleration, and the estimated load torque TL.

Regarding the acceleration, solid line indicates the motor acceleration "a", broken line indicates the acceleration moving average value A for one electrical angle cycle, and chain line indicates the acceleration moving average value AA for one mechanical angle cycle. In FIG. 6, a time scale and the like are changed properly. Herein, a description is made assuming that the motor 10 rotates in a positive direction.

When the target shift range is changed at time x10, the energization flag is set, the target count value θcmd is set to the temporary value θt, and the drive of the motor 10 is started. Since the target count value θcmd is corrected before the detent roller 26 gets over the peak 210, the temporary value θt may be set to any value with which the detent roller 26 can get over the peak 210. When the drive of the motor 10 is started, the encoder count value θen and the motor speed SPm increase. Further, the motor acceleration "a" becomes substantially constant at a certain value. As the motor speed SPm increases, the motor torque TM decreases from the initial driving torque. When the backlash idle running state ends and the motor 10 and the output shaft 15 rotate integrally, amounts of change in the motor speed SPm and the motor torque TM decrease. In addition, the motor acceleration decreases, and the estimated load torque TL increases.

The following describes the estimated load torque TL. When the motor 10 is rotating within the range of play, motor friction becomes a load. When the motor 10 rotates integrally with the output shaft 15, in addition to the motor friction, the output shaft friction and a spring force of the detent spring 25 become loads. Therefore, a load torque T2 in the integral rotation section is greater than a load torque T1 in the idle running section. That is, T1<T2.

In the present embodiment, the load determination threshold TLth that is between the load torques T1, T2 is set, and it is determined that the idle running state has ended at time x11 when the estimated load torque TL is greater than the load determination threshold TLth. Then, the encoder count value θen at this time is set as the angle correction value θp, and the target count value θcmd is calculated based on the angle correction value θp (see Expression (6)). In FIG. 6, a calculation delay and the like may be ignored, and it may be assumed that the target count value θcmd is calculated at the same time as the target count value θcmd is changed at time x11. However, the timing at which the target count value θcmd is switched from the temporary value θt may be any timing before the detent roller 26 gets over the peak 210 of the detent plate 21.

In the present embodiment, the motor acceleration is used for calculating the estimated load torque TL. As shown in FIG. 6, the motor acceleration "a" may be an undesirable value with a large vibration component, particularly in the valley-valley rotation section. When the estimated load torque TL is calculated using the motor acceleration "a" having many undesirable components, the estimated load torque TL also has many undesirable components, and the end of the backlash idle running state may not be determined properly.

The motor acceleration "a" vibrates due to a motor torque ripple in the electrical angle cycle of 360° and a torque ripple corresponding to gear efficiency in the mechanical angle cycle of 360°. As indicated by broken line in FIG. 6, by calculating the acceleration moving average value A for the electrical angle of 360°, a high-frequency vibration component of the motor acceleration "a" may be reduced. Further, by calculating the acceleration moving average value AA for the mechanical angle of 360° by using the acceleration moving average value A for the electrical angle of 360°, a low-frequency vibration component of the motor acceleration "a" may be reduced. In the present embodiment, the estimated load torque TL is calculated using the acceleration moving average value AA to reduce the undesirable components included in the estimated load torque TL, and hence the end of the backlash idle running may be properly determined using the estimated load torque TL.

The shift range control device 40 of the present embodiment switches the shift range by controlling the drive of the motor 10, and includes the parameter calculation unit 51 and the drive control unit 55. The parameter calculation unit 51 calculates the encoder count value θen as a motor angle based on the motor rotation angle signal SgE acquired from the encoder 13 detecting the rotational position of the motor 10. The parameter calculation unit 51 calculates the motor acceleration "a" based on the encoder count value θen. The parameter calculation unit 51 calculates the acceleration moving average values A, AA that are moving averages of the predetermined electrical angle cycle and the predetermined mechanical angle cycle of the motor acceleration "a." In the present embodiment, the parameter calculation unit 51 corresponds to the "angle calculation unit," the "acceleration calculation unit," and the "moving average calculation unit." The drive control unit 55 uses the acceleration moving average values A, AA to control the drive of the motor 10 so that the encoder count value θen becomes the target count value θcmd corresponding to the target shift range. By calculating the acceleration moving average values A, AA, the vibration component of the motor acceleration "a" may be reduced, and hence it is possible to control the drive of the motor 10 by using the acceleration moving average values A, AA without using the detected value of the output shaft sensor. Accordingly, highly accurate positioning control may be executed.

In the shift-by-wire system 1, play exists between the motor shaft 105 that is the rotating shaft of the motor 10 and the output shaft 15 to which the rotation of the motor 10 is transmitted. The drive control unit 55 includes the idle running determination unit 56 and the target setting unit 57. The idle running determination unit 56 uses the acceleration moving average value AA to determine end of an idle running state in which the motor 10 is rotating within the range of play. The target setting unit 57 uses the angle correction value θp corresponding to the encoder count value θen at the end of the idle running state, to set the target count value θcmd.

In the present embodiment, the end of the idle running state is determined based on the motor rotation angle signal SgE as a signal from the encoder 13, and the target count value θcmd is set based on the encoder count value θen at the end of the idle running. Therefore, it is possible to properly set the target count value θcmd without executing learning processing for a play amount by the abutting control, and to execute highly accurate positioning control. Further, when the abutting control is executed, the detent mechanism is applied with stress because the detent roller 26 is abutted against the detent plate 21 with a relatively large torque. This makes it necessary to design the detent mechanism or the like so as not to be damaged by the abutting control. In the present embodiment, with the abutting control being unnecessary, it is possible to simplify the shift range switching mechanism 20.

Since the output shaft angle as the rotational position of the output shaft 15 is not used for the determination of the end of idle running and the setting of the target count value θcmd, the output shaft sensor for detecting the rotational position of the output shaft 15 may be omitted or the detection accuracy may be moderated. Furthermore, by using the acceleration moving average value AA with the vibration component reduced, it is possible to properly determine the end of the idle running.

When it is determined that the estimated load torque TL calculated based on the acceleration moving average value AA is greater than the load determination threshold TLth (S105: YES in FIG. 5), the idle running determination unit 56 determines that the idle running state has ended. By using the estimated load torque TL, the end of the idle running state may be accurately determined by relatively simple processing. The motor acceleration "a" is calculated for each pulse edge-triggered interrupt of the motor rotation angle signal SgE. Therefore, it is possible to properly calculate the motor acceleration "a".

Other Embodiments

In the embodiment described above, the acceleration moving average value AA for one mechanical angle cycle has been used for the calculation of the estimated load torque. In another embodiment, the acceleration moving average value A for one electrical angle cycle may be used for the calculation of the estimated load torque. One of the calculation of the acceleration moving average value for a predetermined electrical angle cycle and the calculation of the acceleration moving average value for a predetermined mechanical angle cycle may be omitted. Further, the value used for calculating the acceleration moving average value A or AA is not limited to a value for one electrical angle cycle or one mechanical angle cycle but may be a value for any number of cycles such as two cycles or a half cycle.

In the above embodiment, the estimated load torque is calculated using the acceleration moving average values A, AA, and the end of idle running is determined based on the estimated load torque. In another embodiment, the end of the idle running may be determined by any method using the acceleration moving average values A, AA. Further, for example, even when the control is executed with the same duty, the acceleration varies depending on the motor temperature. Therefore, the acceleration moving average value may be used for processing related to the motor control other than the idle running determination, such as changing a control constant in accordance with the acceleration moving average value.

In the above embodiment, the motor is the DC brushless motor. In another embodiment, the motor may be any motor, such as a switched reluctance motor. In the above embodiment, the number of winding sets of the motor is not mentioned, but one winding set or multiple winding sets may be used. In the above embodiment, the motor rotation angle sensor is an encoder. In another embodiment, the motor rotation angle sensor is not limited to the encoder, but any other device such as a resolver may be used. That is, the motor angle is not limited to the encoder count value but may be any value that may be converted into a motor angle.

In the above embodiment, the output shaft sensor may be omitted. In another embodiment, an output shaft sensor that detects the rotational position of the output shaft may be provided. For example, when the output shaft sensor is normal, the end of the idle running state may be determined using the detected values of the motor rotation angle sensor and the output shaft sensor, and when the output shaft sensor may not be used due to having a fault or the like, the end of the idle running state may be determined based on the acceleration moving average value as in the above embodiment.

In the above embodiment, the detent plate is provided with two recesses. In another embodiment, the number of recesses is not limited to two but may be any number. For example, four recesses may be provided corresponding to the respective ranges of P (parking), R (reverse), N (neutral), D (drive). Further, the shift range switching mechanism, the parking lock mechanism, and the like may be different from those in the above embodiment.

In the above embodiment, the speed reducer is provided between the motor shaft and the output shaft. Although the details of the speed reducer are not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism other than the speed reducer may be provided. That is, in the above embodiment, the description has been made mainly on the case where "play" between the motor shaft and the output shaft exists between the gear of the speed reducer and the motor shaft. However, the "play" may be considered as the total of play, backlash, and the like existing between the motor shaft and the output shaft. As mentioned above, the present disclosure is not limited to the above embodiments but may be implemented in various forms in the scope not deviating from its gist.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device for switching a shift range by controlling drive of a motor, the shift range control device comprising:
    an angle calculation unit that is configured to calculate a motor angle based on a motor rotation angle signal acquired from a motor rotation angle sensor detecting a rotational position of the motor;
    an acceleration calculation unit that is configured to calculate a motor acceleration based on the motor angle;
    a moving average calculation unit that is configured to calculate an acceleration moving average value as a moving average of at least one of a predetermined electrical angle cycle and a predetermined mechanical angle cycle of the motor acceleration; and
    a drive control unit that is configured to adopt the acceleration moving average value to control the drive of the motor, such that the motor angle has become a target motor angle value corresponding to a target shift range,
    wherein play is present between a motor shaft as a rotation shaft of the motor and an output shaft to which rotation of the motor is transmitted, and
    wherein the drive control unit includes:
        an idle running determination unit that is configured to adopt the acceleration moving average value to determine end of an idle running state in which the motor is rotating within a range of the play; and
        a target setting unit that is configured to adopt an angle correction value corresponding to the motor angle at the end of the idle running state, to set the target motor angle value.

2. The shift range control device according to claim 1, wherein the idle running determination unit is further configured to determine the end of the idle running state, in response to determining an estimated load torque calculated based on the acceleration moving average value being greater than a load determination threshold.

3. The shift range control device according to claim 1, wherein the motor acceleration is calculated for each pulse edge-triggered interrupt of the motor rotation angle signal.

4. A shift range control device for switching a shift range by controlling drive of a motor, the shift range control device comprising:
    a microcomputer configured to:
        calculate a motor angle based on a motor rotation angle signal acquired from a motor rotation angle sensor detecting a rotational position of the motor;
        calculate a motor acceleration based on the motor angle;
        calculate an acceleration moving average value as a moving average of at least one of a predetermined electrical angle cycle and a predetermined mechanical angle cycle of the motor acceleration; and
        adopt the acceleration moving average value to control the drive of the motor, such that the motor angle has become a target motor angle value corresponding to a target shift range,
    wherein play is present between a motor shaft as a rotation shaft of the motor and an output shaft to which rotation of the motor is transmitted, and
    wherein the microcomputer is further configured to:
        adopt the acceleration moving average value to determine end of an idle running state in which the motor is rotating within a range of the play; and
        adopt an angle correction value corresponding to the motor angle at the end of the idle running state, to set the target motor angle value.

\* \* \* \* \*